(12) United States Patent
Harres et al.

(10) Patent No.: US 9,212,944 B2
(45) Date of Patent: Dec. 15, 2015

(54) WEIGHT DETERMINATION FOR OBJECTS MOVING PAST A FIXED SPOT

(75) Inventors: Luiz Carlos Harres, Allen, TX (US); Michael David Carpenter, Arlington, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 678 days.

(21) Appl. No.: 13/450,880

(22) Filed: Apr. 19, 2012

(65) Prior Publication Data

US 2012/0271592 A1 Oct. 25, 2012

Related U.S. Application Data

(60) Provisional application No. 61/476,944, filed on Apr. 19, 2011.

(51) Int. Cl.
*G01G 9/00* (2006.01)
*G01G 19/00* (2006.01)

(52) U.S. Cl.
CPC .............. *G01G 9/005* (2013.01); *G01G 19/002* (2013.01)

(58) Field of Classification Search
CPC .............................. G01G 19/002; G01G 9/005
USPC ................................... 702/103; 177/25.13, 50
See application file for complete search history.

(56) References Cited

U.S. PATENT DOCUMENTS

| | | | | |
|---|---|---|---|---|
| 5,535,127 A | * | 7/1996 | Uno et al. | 705/406 |
| 5,585,603 A | * | 12/1996 | Vogeley, Jr. | 177/25.13 |
| 2007/0129957 A1 | * | 6/2007 | Elliott et al. | 705/1 |
| 2008/0251429 A1 | * | 10/2008 | Norris et al. | 209/584 |

* cited by examiner

*Primary Examiner* — Andrew Schechter
*Assistant Examiner* — Peter Ngo

(57) ABSTRACT

System, methods, and computer-readable media. A method includes transporting a mail piece, and during transport, determining physical dimensions of the mail piece. The method includes, during transport, determining a density profile of the mail piece using an x-ray scanner and determining a weight for the mail piece according to the physical characteristics and the density profile. The method includes selectively separating the mail piece during transport based on the determined weight.

21 Claims, 5 Drawing Sheets

WEIGHT DETERMINATION FOR OBJECTS MOVING PAST A FIXED SPOT

CROSS-REFERENCE TO RELATED APPLICATION

This application claims the benefit of the filing date of U.S. Provisional Patent Application 61/476,944, filed Apr. 19, 2011, which is hereby incorporated by reference.

TECHNICAL FIELD

The present disclosure is directed, in general, to processes and devices for determining object characteristics, and can be applied in particular to weight determination in mail and parcel processing.

BACKGROUND OF THE DISCLOSURE

Improved systems are desirable.

SUMMARY OF THE DISCLOSURE

Various disclosed embodiments include systems, methods, and computer-readable media. A method includes transporting a mail piece, and during transport, determining physical dimensions of the mail piece. The method includes, during transport, determining a density of the mail piece using an x-ray scanner. The method includes determining a weight for the mail piece according to the physical dimensions and the density. The method includes selectively diverting the mail piece during transport based on the determined weight.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
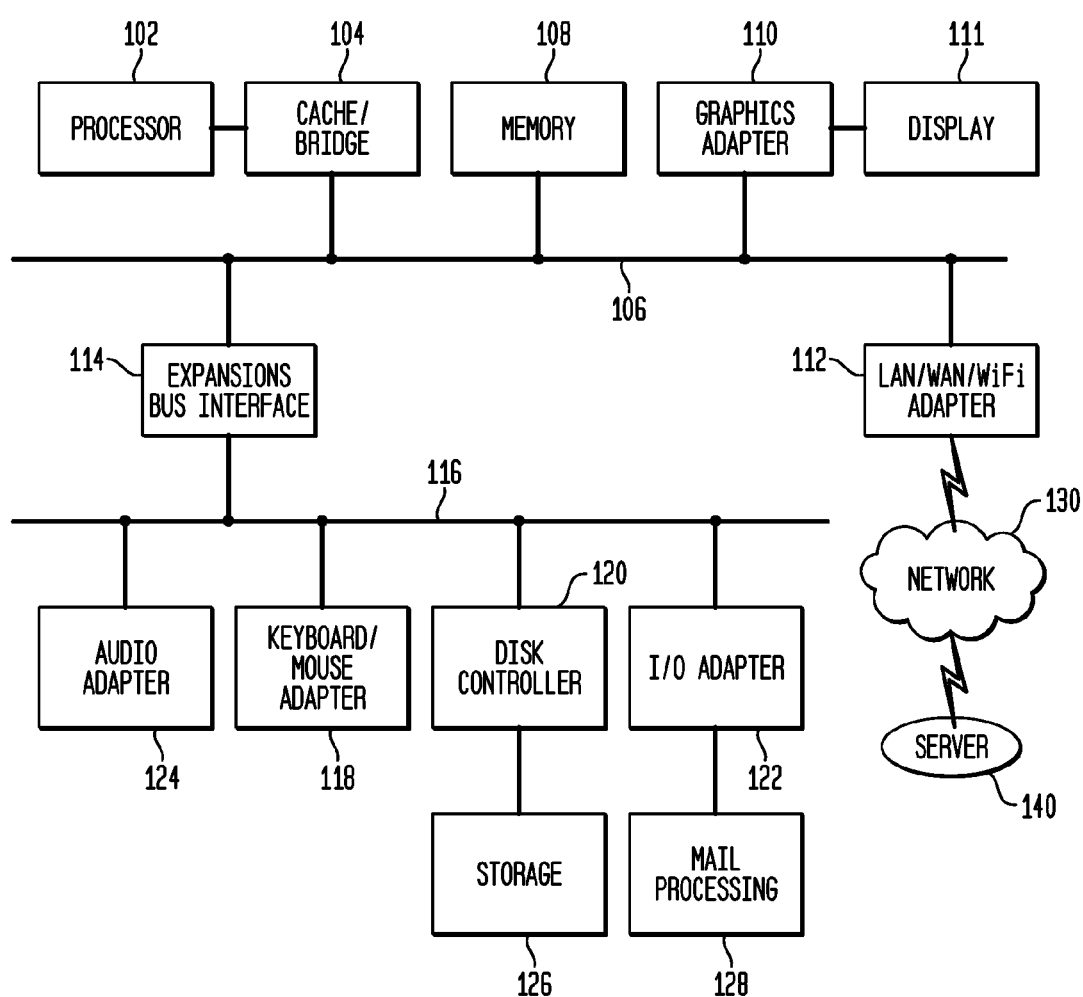
FIG. 1 depicts a block diagram of a mail processing system in which an embodiment can be implemented.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Postal agencies and delivery services often use weight, the force of gravity on an object, as a factor in determining the price of an item's delivery. Postage rates increment according to ranges of weight, with a precise weight cap for each range in price. For example, letters weighing 3.3 ounces or less, prepared and delivered according to a specific standard, are charged the same delivery service fee. Mailpiece designers and manufacturers, in a desire to optimize their delivery value, tend to design and manufacture mail items that weigh as much as possible at the given rate. Analysis of the distribution of the weight of mail items in such a situation reveals a concentration of mail items at each increment in the weight/rate structure. Significant revenue is lost because of mail that weighs more than the postage paid for its delivery would allow.

The quantity of postal items handled by postal agencies makes the individual weight measurement very difficult, and automatic weighing modules are typically integrated into the processing equipment that prepares postal items for delivery. Existing automatic weighing solutions depend on measuring the stress or strain applied to a mechanical structure that carries mail items in motion during their processing. Since the mail items being processed tend to weigh far less than the typical components from which processing machines are composed, the functional portion of the machine dedicated to determining weight tends to be made from exotic, low-mass components, such that the difference in strain or stress on the related structures between the weight of the structure alone, and the weight of the structure and a mail item is significantly different enough that it can be measured with precision. The use of relatively exotic, low weighing more expensive than the rest of the machine, which is composed of more ordinary materials.

The time required for the structure carrying the mail item to settle also has a significant effect on the design of the weight determination functional portion of the processing system. This effect is driven by the duration of settling time required and the rate at which the mail processing system must process mail items. These factors determine how many channels of weighing are required to allow the weighing function to keep up with the processing rate of the mail processing machine. Each processing channel represents an increment of cost in functional components, which tend to be more costly than typical components. Each weight determination processing channel represents a precision measurement instrument in which accuracy can be affected by temperature, vibration, wear, and even location, based on variable barometric pressure according to altitude. Calibration is necessary when precision scales are moved, and periodic calibration regimes are required to ensure that accuracy is maintained. Calibration fees are a recurring cost associated with operating a precision scale.

The high cost of integrating and maintaining weight measurement functionality into mail processing systems has led to statistical sampling methods, whereby a few dedicated systems weigh a small portion of the mail items, to validate that postage payment according to weight for those items is sufficient. The amount of mail being processed, the complexity of mail processing, and the cost of weighing mail cause an environment in which very few mail items have their weight checked, and the potential for the postal agency delivering mail with inadequate postage according to weight is high.

Disclosed embodiments can determine the mass weight of objects moving past fixed positions ("weigh on the fly") or assign weights to the objects based on physical characteristics determined as the objects move past the various sensors. The physical dimensions of each object are measured by thickness sensors, profile sensors, and machine vision, and the "area mass density" of the object can be sampled across its surface using a calibrated low intensity x-ray emitter and detector, together comprising an x-ray scanner. The weight can be calculated by multiplying the measured area with the measured density sampled, given uniform density of the object. Further reliability of the measurement can be realized by extracting features derived from these sensors and processing the features in a classifier.

In other embodiments, the mean density of the object can be calculated by the system, and used to multiply by the measured area to determine the total weight.

In other embodiments, measured physical characteristics are used to create a classifier corresponding to the object. The classifier can be used to look up a corresponding weight for the object as described in more detail below. The classifier can be created according to a plurality of objects, by identifying common physical characteristics of the objects that can then be used to identify other similar objects, which often will be for the same mail batch or sender.

Although this disclosure describes mail items as the moving objects being weighed, it is to be understood that other objects could also be measured using the techniques described herein.

As used herein, "mail" or "mail piece" can include letter-type mail pieces, flats, parcels, postcards, or other objects or items being processed as described herein, whether by governmental postal services or private companies.

FIG. 1 depicts a block diagram of a mail processing system in which an embodiment can be implemented, for example as one of the systems, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to mail processing devices 128, as described herein, to image, scan, x-ray, measure, transport, label, address process, sort, and otherwise processes the mail pieces in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing or imaging facility.

FIG. 1 is particularly directed to mail processing systems, but similar systems can be used for processing any object, with mail processing devices 128 replaced with suitable devices for similar processing of the other objects.

Embodiments disclosed herein use an efficient process for determining the physical dimensions and density of mail pieces as they are transported on the mail processing devices, and use this information to calculate the weight of each item. The calculated weight can then be used to divert mail that cannot be machined, charge the sender for any extra required postage or other fees, or otherwise process the mail in any manner required for its particular weight. Disclosed embodiments can perform these functions without ever need to stop a mail piece during transport in order to individually weight it.

Mail items are typically made of paper, but the characteristics of the paper vary a great deal. In addition, mail items may contain other items not made of paper, such as CDs, DVDs, credit cards, or ink pens. This wide variation of material types means that a mail item's total mass cannot be precisely calculated according to its displacement alone. Both the displacement and the density of a mail item must be known in order to calculate the mail item's weight.

Various embodiments disclosed herein use sensors integrated into the mail processing system to take measurements that are indicative of displacement and density. Displacement can be known by a combination of camera sensors that can calculate a mail item's height and length by virtue of the number of pixels that compose as image of the mail item, along with either profile measurement sensors or thickness sensors. Density can be measured using low-power x-ray radiography. Features derived from the sensor data, such as variations in thickness, variations in density, height, and length, can be used to determine the item's weight according to a classifier. The classifier is trained according to the relationships between features and known mail item weights. Alternatively, weight can be calculated by multiplying the measured area or volume with the measured density sampled.

Embodiments disclosed herein are superior to existing methods in that they are far less expensive, require a minimal area in existing processing machines to integrate the function, and provide excellent accuracy.

Figure 2:
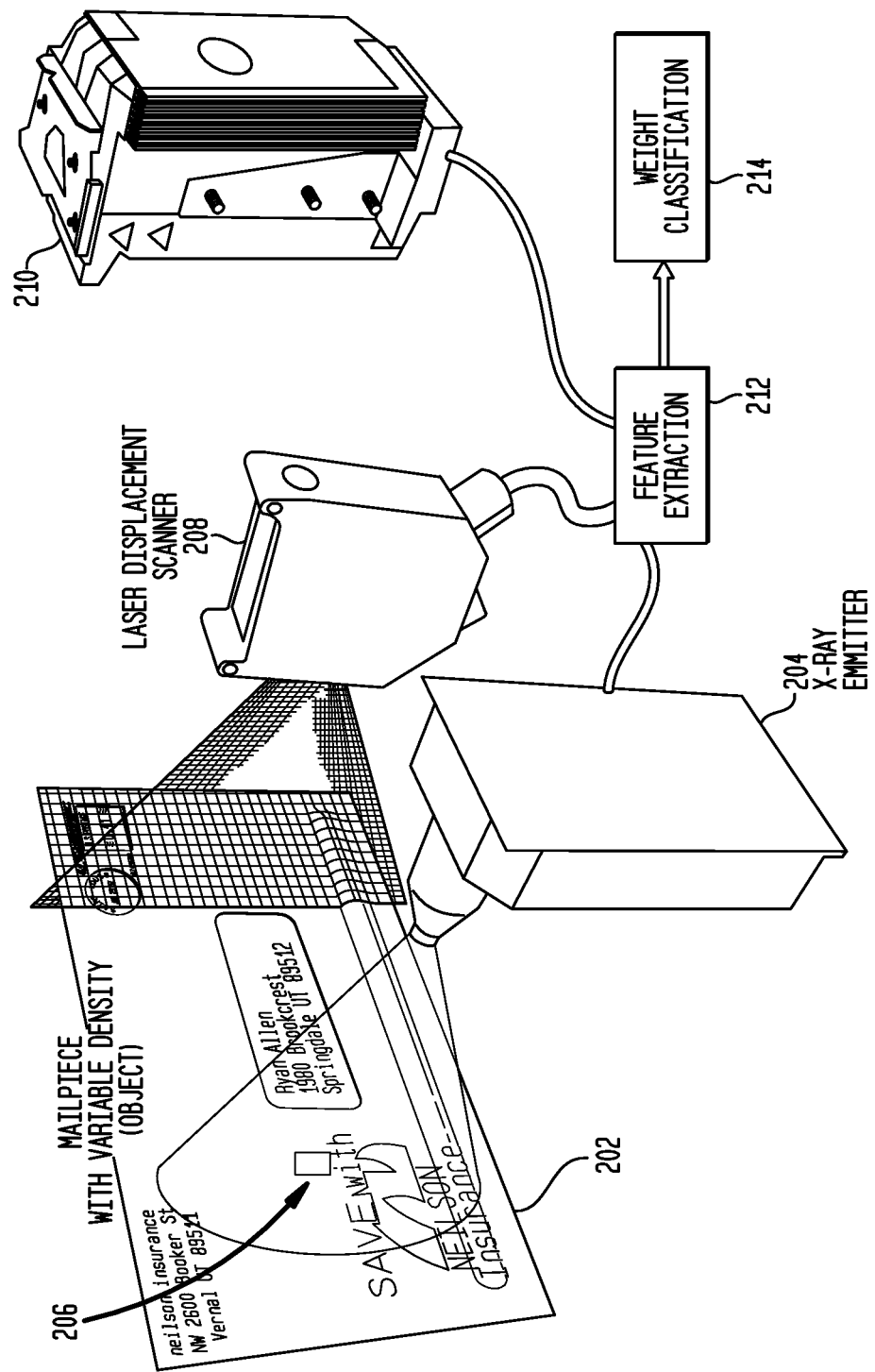
FIG. 2 shows a simplified diagram of mail processing devices for use in weight determination in accordance with disclosed embodiments.

FIG. 2 shows a simplified diagram of mail processing devices for use in weight determination in accordance with disclosed embodiments. FIG. 2 illustrates the use of multiple sensing technologies to determine displacement and density, and the calculation of weight based on features derived from the sensor data processed by a trained classifier.

This figure shows mail piece 202 (or other variable-density object) in the process of being scanned while being transported. X-ray emitter 204 illuminates the mail piece 202 at x-ray sensor point 206. Additional sensor points may also be desirable, such that the entirety of mail piece 202 can be imaged according to density.

Laser displacement scanner 208 scans mail piece 202 as it is transported past to determine the thickness and variations in thickness of the mail piece 202 at relatively high resolution. In other embodiments, a lower resolution of thickness can be measured with fewer measurement points. Line-scan camera 210 images the mail pieces as it is transported. According to a preferred embodiment, these are each fixed, mounted sensors that capture data from mail items in motion to determine weight as described herein.

X-ray emitter 204, laser displacement scanner 208, and line-scan camera 210 can each be implemented as part of mail processing devices 128, and are each connected to communicate with a feature extraction process 212 that can be implemented in mail processing system 100. Feature extraction process 212 communicates with a weight classification process 214 that can be implemented in mail processing system 100.

The level of detail in features and granularity of the various sensors illustrated in the example of FIG. 2 depends on the physical variability of the mail items in which weight is being estimated, such that ambiguity between weight classes can be resolved. In a population of mail items in which there are few weight classes, very few features from relatively simple sensors are sufficient to classify the population into weight classes. For example, a simple spot thickness detector and a spot x-ray density measurement would be sufficient to resolve ambiguity for a simple population. For very complex mail item populations, rich feature sets derived from higher resolution sensors can be used to unambiguously and accurately resolve the population into constituent weight classes.

Because the number of types of diverse density portions within a single mail item is relatively few, low power x-ray with a single point sensor can offer sufficiently rich feature data to resolve density-related weight-class ambiguity. Multiple sensors may be configured with a single emitter lbr richer density feature data in the x-ray scanner. Since mail items are processed sequentially in a stream with gaps between items, it is possible to calibrate the emitter and sensor in the airspace "gap" between items.

Figure 3:
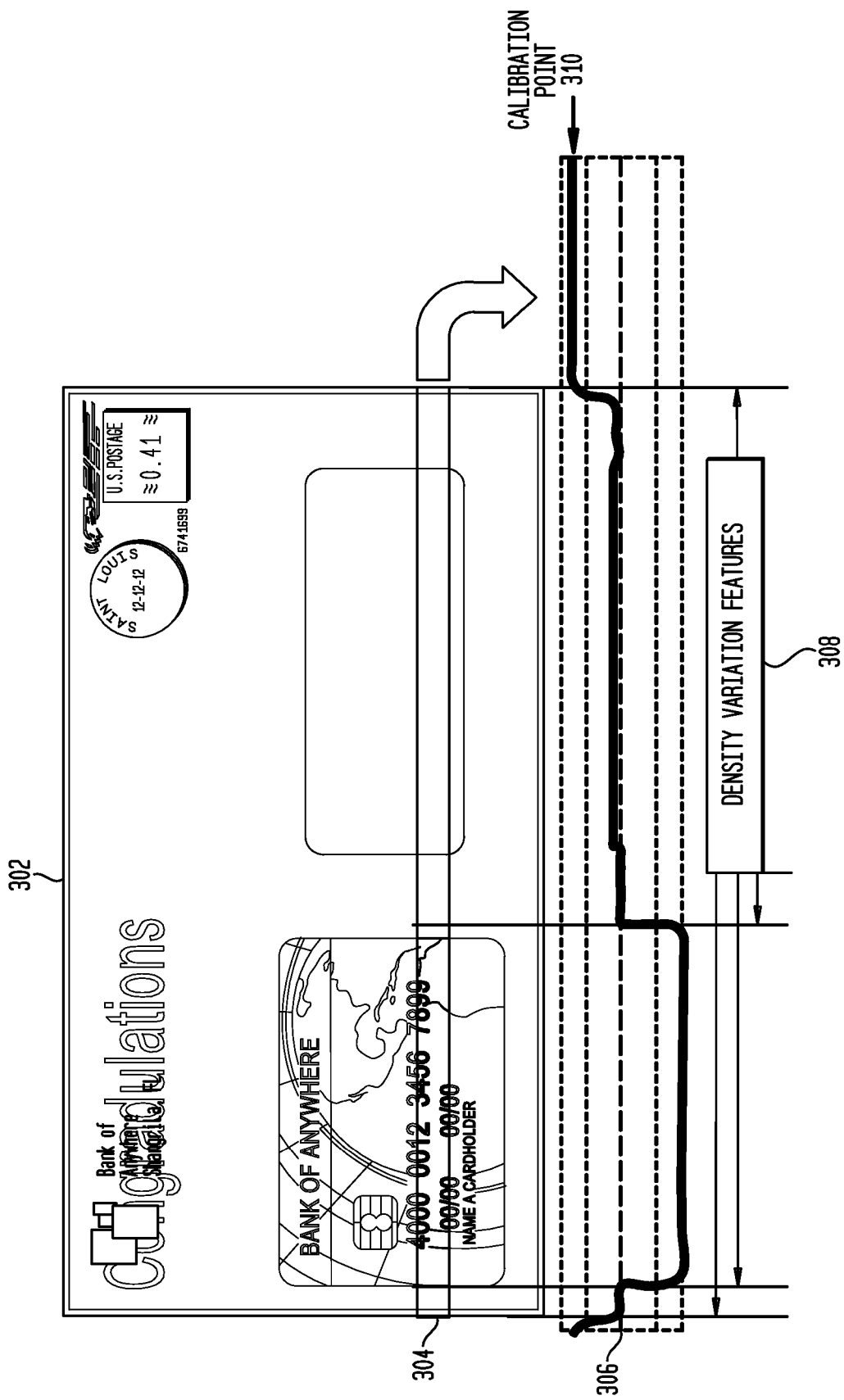
FIG. 3 illustrates single-point density measurement and calibration in a mail item gap, in accordance with disclosed embodiments.

FIG. 3 illustrates single-point density measurement, examples of density-related features, and calibration in a mail item gap, in accordance with disclosed embodiments.

In this figure, mail piece 302 is scanned as it moves past a low power x-ray scanner with a single point sensor, which scans the mail piece as is moves from left to right, in this example, past the x-ray sensor point along line 304. The system, using the x-ray scanner, determines the density along the mail piece 302, represented at graph 206, which shows a low density (represented as the middle horizontal line) across the paper layers of the mail piece 302, a higher density (represented as the lowest horizontal line) across the portion of the mail piece 302 that contains the credit card, and a slightly lower density than the paper layers across the portion with the window. The shifts or variations in density represent density variation features 308 that can be used to classify the mail piece 302. Finally, the measurements taken in the air "gap" between mail pieces can be used to calibrate the x-ray scanner, such as at calibration point 310.

Beyond profile or thickness and density measurements, other features that are helpful in disambiguating weight classification can be derived from the visible light image that is normally recorded during mail processing, such as by line-scan camera 210, as required for recognition and sortation. These features include company brands that tend to accompany a credit card or a DVD and postage paid.

Disclosed embodiments provide technical advantages not just in determining the weight of a mail piece, but also in determining if a mail piece weighs more than the postage paid for it would allow. This is an important aspect of protecting revenues for a postal agency, particularly with bulk business mailers. For bulk business mail, the mailers that pay for the delivery of the mail items are required to provide detailed information about the mailing, to include the number of pieces and the weight-driven rate that defines the delivery price. For most mail items, it is possible to identify data (including weight information) based on identifying marks on the mail item, such as barcodes and other printed identifiers. For mail items for which no describing data is available, it is necessary to determine the postage paid for the item (and thereby discern weight limits) by reading the postage indicia on the mail item, such as stamps, meter marks, or permits.

Figure 4:
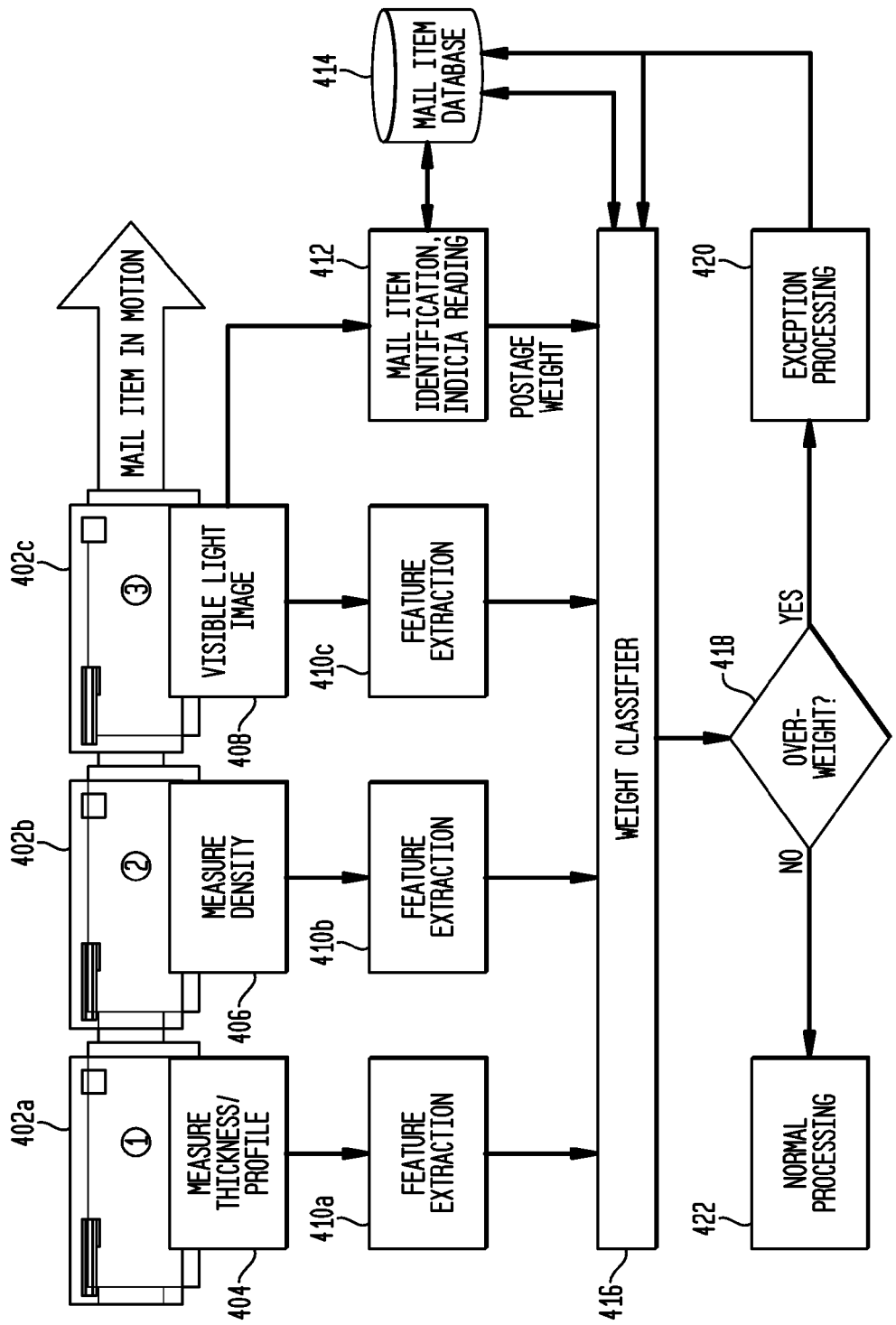
FIG. 4 depicts a functional block diagram of a weight classification system in accordance with disclosed embodiments.

FIG. 4 depicts a functional block diagram of a weight classification system in accordance with disclosed embodiments, as can be implemented in a mail processing system 200 as described herein.

As mail pieces 402a, 402b, and 402c are transported through the mail processing system, they are processed as described herein for weight determination and classification.

For example, mail piece 402a is measured for its thickness and profile as described herein, as shown at 404, and the results are sent to a feature extraction process 410a. Feature extraction process 410a can determine a thickness profile as described herein.

Mail piece 402b is measured for density as described herein, as shown at 406, and the results are sent to a feature extraction process 410b. Feature extraction process 410b can determine a density profile as described above. The density profile can be a comprehensive density, such as by scanning and summing the density of the entire mail piece as described herein, or can be, for example, a profile determined by a single-point density scan across the mail piece, or otherwise. In particular, the density measurement can include recording variations in density across the mail piece, deriving distinctive features from these variations, and using these features for the density profile.

Mail piece 402c is scanned for a visible light image as described herein, as shown at 408, and the results are sent to a feature extraction process 410c. Feature extraction process 410c can determine the physical characteristics such as length and height of the mail piece. The visible light image can also be sent to a mail item identification and indicia reading process, as shown at 412, and the results can be stored in or correlated to a mail item database 414. These results can include, for example, the postage paid for the mail piece as indicated by any indicia.

Mail item database 414 can also store and maintain the weight classifiers described herein. Each stored weight classifier can include physical characteristic data including any extracted features, thickness profile data, density profile data, and otherwise, along with the weight associated with that classifier. The weight classifiers can be used to determine an expected weight of each mail item based on one or more of the physical characteristics of the mail item, and can be updated when necessary, such as when a mail piece is actually weight as described herein, so that the accuracy of the weight classifiers can be verified or refined. The weight classifiers can be associated with various mail classes; for example, one or more classifiers can be associated with first class U.S. mail, which has a standard associated postage requirement.

Note that feature extraction processes 410a, 410b, and 410c can be implemented as separate or combined processes on the mail processing system. Further, the various processes shown at 404, 406, and 408 can be performed concurrently and asynchronously, so that each mail pieces is subjected to each process at whatever time it passes that processing point during transport. Of course, the processes do not have to be performed in any particular order.

The results from the various feature extraction processes and from the mail item identification and indicia reading can be sent to a weight classifier process as shown at 416. The weight classifier process uses the results of the feature extraction to determine the weight of the mail piece, such as by determining the volume of the mail piece from the length, height, and thickness profile, and calculating the weight of the mail piece based on the volume and the density profile for the mail piece. Determining the weight of the mail piece can also or alternately include using the results of the feature extraction to determine the weight of the mail piece by referencing the stored weight classifiers in the mail item database, using on or more of the physical characteristics, to retrieve an expected weight for the mail piece, and using that expected weight as the determined weight. This step can include associating mail piece with a mail class according to the mail classifier.

In particular, using a profile determined by a single-point density scan or other "sampled" density scan, in conjunction with stored weight classifiers as described herein, can effectively determine the weight of mail pieces without the expense, processing delay, or other issues associated with either physically weighing every mail pieces or using a making a complete density scan of each mail piece.

The total population of mail can be divided into mail classes of mail items according to the postage required to accomplish delivery, and corresponding mail classes can be maintained in the mail item database associated with each weight classifier. Within these mail classes, various combinations of attributes, which can include various features derived from physical characteristics including thickness profile, graphical patterns, density profile, dimensions, and others, may be recognized to segregate mail pieces by mail class. A weight classifier can be initially trained for accuracy according to data that is known to be correct. The weight classifier may also be occasionally tuned for improved accuracy, or to account for new mail classes, with data that is known to be correct.

The system can then determine, from the determined weight of each mail piece, whether that mail piece is overweight, as shown at 418, in particular as compared to the postage paid for the mail piece or its associated mail class. If the mail piece is not overweight, it can be processed normally as shown at 422.

If the mail piece is overweight, it can be sent to exception processing as shown at 420, which can include returning to sender, discarding, charging the sender an additional fee, or otherwise. Exception processing can include a validation of the weight using conventional scale technology and may include charging additional postage prior to delivering the mail item. A portion of mail that has been determined to be near the weight threshold for the postage paid can also be treated as exceptions, so that the weight classifier results can be validated through the exception handling process. Relevant data from the entire process can be retained for items that are passed to the exception handling process.

In particular, exception processing can include weighing the mail piece on a known-accurate scale or other device, and using the results to update or refine the weight classifier, by passing results back to the mail item database 414 or the weight classifier process as shown at 416.

In this functional example, all of the physical mail handling can be performed, for example, by mail processing devices 128. The processing functions can be performed by one or more processors, and the mail item database 414 can be maintained in a storage device or memory of the mail processing system.

Mail that is processed through the exception handling process, to include weight validation, can be correlated with previous system processing data. This allows the system to compare results from the weight classifier with results from the certified scale in exception processing. This comparison process can provide continual feedback on the accuracy of the system, and can allow the weight classifier to be automatically retrained on a periodic basis.

Figure 5:
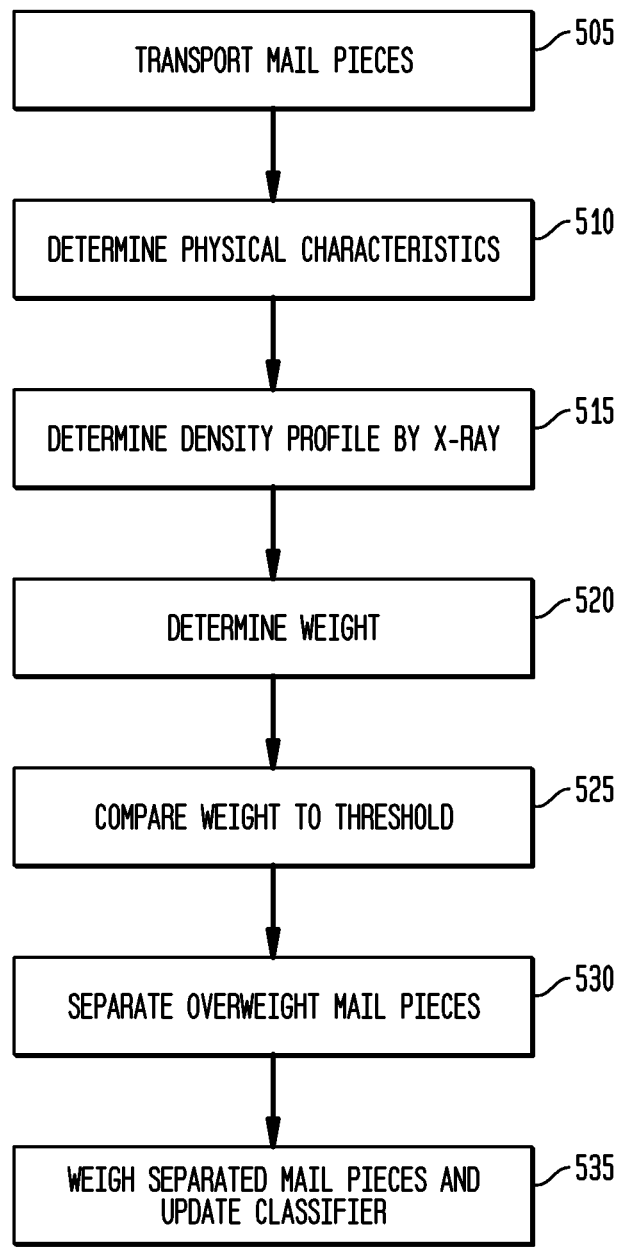
FIG. 5 depicts a flowchart of a process in accordance with disclosed embodiments.

FIG. 5 depicts a flowchart of a process in accordance with disclosed embodiments. The "system", as used below, refers to a mail processing system as described above, or other suitable system for determining the weight of objects being transported as described herein.

The system transports a plurality of mail pieces or other objects (step 505). The remainder of this exemplary process will be described in terms of a mail piece, but can be applied to other objects as described herein.

During transport, the system can determine the physical characteristics of each mail piece (step 510). This step can be performed as the mail piece moves past one or more sensors, and can include determining the thickness, height, and length of the mail piece. This step can include producing a visible light image of the mail piece and determining one or more physical dimensions of the mail piece from the visible light image and can include identifying indicia, markings, or other surface features of the mail item. This step can include producing a thickness profile of the mail piece. This step can be performed in a feature extraction process.

During transport, the system determines a density profile of the mail piece (step 515). This step can be performed using an x-ray scanner, including a low power x-ray scanner with a single point sensor. This step can be performed as part of a feature extraction process. In some embodiments, the system can determine a density profile of the mail piece by collecting a density profile of the entire mail piece as it moves past an x-ray scanner with a vertical array of sensors.

The system determines a weight for the mail piece based on the physical characteristics the mail piece (step 520). This step can be performed, in particular, by using the density profile, in some eases in combination with other physical characteristics of the mail piece, to reference a corresponding stored weight classifier in a mail item database. The stored weight classifier can then be retrieved and used as the determined weight for the mail piece.

Alternately or additionally, step 520 can be performed by directly calculating a weight for the mail prices using the density profile and other physical characteristics of the mail piece, and in particular can be performed by correlating the thickness profile with the density profile for the mail piece. The weight can be determined as a product of the mass, itself a product of volume and density, and the force of gravity. In some cases, the physical dimensions are not used, and instead the weight of the mail piece is determined by summing the entire density profile, such as by summing all pixels in the density profile or otherwise, and multiplying the sum of the density profile by a calibrating weight factor. Such a calibrating weight factor may be stored as part of a weight classifier as described herein.

The system can determine if the determined weight of the mail piece is near to or over a weight threshold for a fee associated with the mail piece (step 525). The fee can be a postage fee, for example, and can be determined in some embodiments. The postage paid represents prepayment for delivery of the mail piece. A record of the payment, or indicium, is typically marked on the mail piece. The payment for delivery varies according to weight. As part of this step, the system can recognize the indicium, for example from the visible light image, to determine prepaid fee associated with the mail piece. The system can compare the prepaid fee, and the weight ranges associated with this fee, with the determined weight of the mail piece to determine if enough postage or other fee has been paid.

The system can selectively separate any overweight or other mail pieces during transport for exception processing, such as when the weight of the mail piece is near to or over the weight threshold for the fee (step 530). Exception processing can include returning to sender, discarding, charging the sender an additional fee, or otherwise. The system can selectively separate a portion of mail pieces that have not been determined to be overweight for their postage, and treat them as exceptions to provide a means of tuning the classifier to the entire population of mail (rather than only those mail pieces that have been classified as overweight). In particular, in some cases exception processing can include weight validation by physically weighing the mail pieces on an accurate scale.

Based on the weight validation, the system correlates the measured weight with previous system processing data (step 535). This can include comparing results from the weight classifier with results from the certified scale. This comparison process can provide continual feedback on the accuracy of the system, and can allow the weight classifier to be automatically retrained on a periodic basis. That is, the separated mail piece can be physically weighed to determine a measured weight, and the mail processing system can use the measured weight to update a stored classifier that corresponds to the separated mail piece. This step can include updating a stored weight classifier according to the measured weight.

Techniques for measuring density through x-ray scanning are known to those of skill in the art. Some such techniques are described in, for example, the following documents, which are hereby incorporated by reference: Bateni, et al., *Prediction of Density in Porous Materials by X-ray Techniques*, 17$^{th}$ World Conference on Nondestructive Testing (2008); Wang, et al., *Evaluation of Density Distribution in Wood-based Panels using X-ray Scanning*, 14$^{th}$ International Symposium on Nondestructive Testing of Wood (2005); Windover, et al., *Thin Film Density Determination by Multiple Radiation Energy Dispersive X-Ray Reflectivity*, Advances in X-Ray Analysis, Vol. 42 (2000); and U.S. Pat. No. 6,167,113 to Armentrout, et al. (2000).

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually early out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. The processes described herein can be performed for a plurality of mail pieces as they are being transported, and can be asynchronously. Features of the various embodiments and processes described above can be combined or modified in still further embodiments, in accordance with the claims.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a mail processing system, comprising:
   transporting a mail piece having a weight;
   during transport, determining physical characteristics of the mail piece;
   during transport, determining a density profile of the mail piece using an x-ray scanner;
   determining the weight of the mail piece according to the physical characteristics and the density profile, by referencing a previously-stored weight classifier corresponding to the density profile, and using a weight associated with the previously-stored weight classifier as the determined weight; and
   selectively separating the mail piece during transport based on the determined weight.

2. The method of claim 1, the weight classifier includes physical characteristic data selected from extracted features, thickness profile data, and density profile data, and includes the weight associated with that classifier.

3. The method of claim 1, wherein the mail processing system also determines a mail class associated with the mail piece based on the previously-stored weight classifier.

4. The method of claim 3, wherein the mail processing system also determines whether the determined weight for the mail piece is over a weight threshold for a fee associated with the mail class.

5. The method of claim 1, wherein determining the physical dimensions of the mail piece includes determining one or more physical dimensions of the mail piece from a visible light image of the mail piece.

6. The method of claim 1, wherein the x-ray scanner is a low-power x-ray scanner with a single point sensor.

7. The method of claim 1, wherein the mail piece is selectively separated when the weight for the mail piece over a weight threshold associated with the mail piece.

8. The method of claim 1, wherein the separated mail piece is physically weighed to determine a measured weight, and the mail processing system uses the measured weight to update a weight classifier corresponding to the mail piece.

9. The method of claim 1, wherein the mail processing system records variations in density across the mail piece, derives density variation features from these variations, and uses the density variation features for the density profile.

10. A mail processing system, comprising:
    at least one processor;
    an accessible memory; and
    a plurality of mail processing devices; the mail processing system configured to transport a mail piece having a weight, and during transport, to:
    determine physical characteristics of the mail piece;
    determine a density profile of the mail piece using an x-ray scanner;
    determine the weight of the mail piece according to the physical characteristics and the density profile, by referencing a previously-stored weight classifier corresponding to the density profile, and using a weight associated with the previously-stored weight classifier as the determined weight; and
    selectively separate the mail piece during transport based on the determined weight.

11. The mail processing system of claim 10, wherein the weight classifier includes physical characteristic data selected from extracted features, thickness profile data, and density profile data, and includes the weight associated with that classifier.

12. The mail processing system of claim 10, wherein the mail processing system also determines a mail class associated with the mail piece based on the previously-stored weight classifier.

13. The mail processing system of claim 12, wherein the mail processing system also determines whether the determined weight for the mail piece is over a weight threshold for a fee associated with the mail class.

14. The mail processing system of claim 10, wherein determining the physical dimensions of the mail piece includes determining one or more physical dimensions of the mail piece from a visible light image of the mail piece.

15. The mail processing system of claim 10, wherein the mail piece is selectively separated when the weight for the mail piece over a weight threshold associated with the mail piece.

16. The mail processing system of claim 10, wherein determining the physical dimensions of the mail piece includes determining a density profile of the mail piece, and the density profile is used to determine the weight by referencing a stored weight classifier.

17. The mail processing system of claim 10, wherein the separated mail piece is physically weighed to determine a measured weight, and the mail processing system uses the measured weight to update a weight classifier corresponding to the mail piece.

18. The mail processing system of claim 10, wherein the mail processing system records variations in density across the mail piece, derives density variation features from these variations, and uses the density variation features for the density profile.

19. A non-transitory computer readable medium having program instructions stored thereon executable by one or more processors to:
    transport a mail piece having a weight;
    determine physical characteristics of the mail piece;
    determine a density profile of the mail piece using an x-ray scanner;
    determine the weight of the mail piece according to the physical characteristics and the density profile, by referencing a previously-stored weight classifier corresponding to the density profile, and using a weight associated with the previously-stored weight classifier as the determined weight; and
    selectively separate the mail piece during transport based on the determined weight.

20. The computer-readable medium of claim 19, wherein the instructions are also executable by the one or more processors to determine a mail class associated with the mail piece based on the stored weight classifier and to determine whether the determined weight for the mail piece is over a weight threshold for a fee associated with the mail class.

21. A method performed by a mail processing system, comprising:
- transporting a mail piece having a weight;
- during transport, determining a density profile of the mail piece using an x-ray scanner, the density profile comprising a plurality of pixels;
- determining the weight of the mail piece by summing all of the pixels in the density profile and multiplying by a calibrating weight factor that is stored as part of a previously-stored weight classifier; and
- selectively diverting the mail piece during transport based on the determined weight.

* * * * *